United States Patent [19]

Wiener et al.

[11] Patent Number: 4,945,505

[45] Date of Patent: Jul. 31, 1990

[54] CORDIC APPARATUS AND METHOD FOR APPROXIMATING THE MAGNITUDE AND PHASE OF A COMPLEX NUMBER

[75] Inventors: Alan I. Wiener, Lexington; Waljeet S. Hundal, Millis, both of Mass.

[73] Assignee: Raytheon Company, Lexington, Mass.

[21] Appl. No.: 473,126

[22] Filed: Jan. 31, 1990

Related U.S. Application Data

[63] Continuation of Ser. No. 259,018, Oct. 17, 1988, abandoned.

[51] Int. Cl.⁵ .................................................. G06F 7/00
[52] U.S. Cl. ................................................. 364/715.03
[58] Field of Search ..................... 364/715.03, 752, 730

[56] References Cited

U.S. PATENT DOCUMENTS

| | | | |
|---|---|---|---|
| 3,829,671 | 8/1974 | Gathright et al. | 364/752 |
| 3,858,036 | 12/1974 | Lunsford | 364/752 |
| 3,952,187 | 4/1976 | Robinson et al. | 364/730 |
| 4,481,601 | 11/1984 | Heinle | 364/815 |
| 4,599,701 | 7/1986 | Vojir et al. | 364/752 |
| 4,747,067 | 5/1988 | Jagodnik, Jr. et al. | 364/748.5 |

OTHER PUBLICATIONS

The Cordic Trigonometric Computing Technique, Voldert, Sep. 1959, pp. 330–334, IRE Transactions on Electronic Computer.

VLSI Array Processors, Kung, Department of Electrical Engineering, Princeton University, 1988 by Prentice Hall, pp. 495–500, p. 655.

Electronic Design, Design Innovation, Chip Converts Cartesian Data to Polar Units at 10 MHz, Dave Bursky, Jun. 11, 1987, pp. 53, 55.

*Primary Examiner*—Gary V. Harkcom
*Assistant Examiner*—Tan V. Mai
*Attorney, Agent, or Firm*—Walter F. Dawson; Richard M. Sharkansky

[57] ABSTRACT

A cartesian to polar coordinate converter using a cordic magnitude circuit for estimating the magnitude and angle of a vector from its known orthogonal components. The vector is described in cartesian coordinates by the complex number $I+jQ$. The magnitude of the vector and its angle are approximated by an iterative process of successively rotating the vector toward one of the orthogonal axes and the cordic magnitude circuit is implemented in one very large scale integrated (VLSI) complementary metal-oxide semiconductor (CMOS) chip. In systems using a typical cordic magnitude circuit, accuracy increases in direct proportion to the number of rotations. The increase is accompanied by a need for an increased word size which results in a slower operating speed. The improved cordic magnitude circuit achieves higher precision without the need for a larger word size. The Q processing portion of the improved circuit takes advantage of the fact that each value of Q is reduced by one-half with each succeeding rotation after the first rotation, thereby vacating the most significant bit (MSB) position. By doubling the resultant value of Q, the MSB is refilled and the least significant bit (LSB) is vacated making room to accommodate the precision growth of one LSB associated with the next rotation. For small magnitude vectors, the I processing portion of the magnitude circuit left shifts the I and Q components by two bit positions at each rotation to accommodate two additional bits of precision in both the I and Q words.

35 Claims, 7 Drawing Sheets

CORDIC APPARATUS AND METHOD FOR APPROXIMATING THE MAGNITUDE AND PHASE OF A COMPLEX NUMBER

This application is a continuation of application Ser. No. 259,018 filed Oct. 17, 1999, now abandoned.

BACKGROUND OF THE INVENTION

This invention relates to digital signal processing and in particular to an apparatus and method for very accurately approximating a magnitude and phase of a complex number given its real and imaginary components.

Determining the magnitude of a complex number such as $I+jQ$ which is a common calculation in radar signal processing applications, has been accomplished by several methods such as CORDIC computing techniques, single interval linear approximation, multiple interval piece-wise linear approximation and scale factor-logarithm approximation.

The term CORDIC was originally defined as standing for COordinate Rotation DIgital Computer by Jack E. Volder in the September 1959 issue of IRE transactions on Electronic Computers in an article titled, "The CORDIC Computing Technique". The CORDIC computing technique was developed especially for use in a real-time digital computer where the majority of the computation involved the discontinuous, programmed solution of the trigonometric relationships of navigation equations and a high solution rate for the trigonometric relationships of coordinate transformation. The basic computing technique in CORDIC is a step-by-step sequence of pseudo rotations which result in an over-all rotation through a given angle or result in a final angular argument of zero. The CORDIC computing technique and variations thereof have been applied in many signal processing applications to find an approximate magnitude of a complex number by means of a process of successive rotations of its representative vector towards one of the real or imaginary component axes. Some drawbacks of CORDIC techniques for magnitude approximation are: complexity of implementation, growth in the number of binary bits required to obtain acceptable accuracy, and excess time required to perform each of the successive iterations.

A second method, widely used in radar signal processing, is single-interval linear approximation. Here, the real and imaginary components, X and Y are compared and the greater one is multiplied by a factor $K_G$ and added to a factor $K_L$ multiplied by the lesser one. When no actual multiplier is available, $K_G$ is unity and $K_L$ is chosen as $\frac{1}{4}$, $\frac{3}{8}$, or $\frac{1}{2}$ to allow implementation with adders. Drawbacks include a need for comparison and multiplexing between X and Y, and poor accuracy of about 3% RMS error (over all angles) and greater than 10% peak error.

A third method as shown in a patent to William M. Vojir et al., U.S. Pat. No. 4,599,701 describes a complex magnitude computing circuit that implements piecewise linear approximations to achieve high precision without the need for iteration and its processing burden. It is a generalization of the second method to multiple intervals wherein the greater (multiplied by a constant) and lesser components are further compared to determine which of two or more sets of constants $K_G$ and $K_L$ should be used in the multiplications. The increased accuracy, compared with the second method, is at the expense of greater complexity and time delay of the additional comparisons.

A fourth method as shown in a patent to Anthony J. Jagodnik, Jr. et al., U.S. Pat. No. 4,747,067 describes a vector magnitude multiple sector approximating circuit which generates a logarithm of the absolute value of the real component and the imaginary component and multiplies these logarithms by a scaling constant pair selected by an address formed by these logarithms forming two products which are added together to form the magnitude. The constant pair is preselected for each one of a plurality of regions within a quadrant of a coordinate system representing a complex plane, and the preselected set of constant pairs for the quadrant is applicable to all quadrants. This method provides a noniterative algorithm with no feedback required, and it is amenable to pipelined implementation with throughput up to one approximation performed per clock cycle in a fully parallel implementation. An accuracy of 0.57% average RMS error (of the value) is achieved with this approach.

The first three of these methods effectively require determination of the phase angle of the input vector to varying degrees of precision. Mechanization, even to simply determine the octant of the angle, requires a "pass the maximum to one destination and the minimum to another" function with considerable complexity of the requisite comparison and multiplexing hardware which must handle all bits of each component. Read-only memories (ROMs) used with the fourth method may not be conveniently implemented on a VLSI chip, and very high accuracies in the range of 0.003% maximum error are not obtainable. It is often desireable to not have to store data by having a pipelined structure as with the CORDIC technique.

SUMMARY OF THE INVENTION

In accordance with the present invention an apparatus and method is provided for determining an approximation of a magnitude and phase of a complex number or vector having a real component X and an imaginary component Y. The apparatus comprises means for computing the approximated magnitude of a complex number or vector using an algorithm for computing the real (I) component and the imaginary (Q) component for each of a plurality of vector rotations of fixed decreasing predetermined values of angles such that the value of the Q component is reduced by approximately one-half with each of the succeeding rotations after a first rotation, the value of the I component at the end of said rotations being the approximated magnitude, and the computing means comprises shifting means for shifting the Q component on each rotation after the first rotation into a vacated most significant bit (MSB) position of the Q component resulting from the predetermined rotations in order to accommodate a one bit LSB growth in the next rotation. In addition, the shifting means further comprises means for left justifying the I component and correspondingly shifting the Q component into the vacated MSB position of the Q component before each of the rotations after the first rotation is performed, providing the three MSBs of the I component are zero. The computing means comprises means for detecting after each of the rotations an overflow of the sign of the Q component for selecting the proper direction of vector rotation in the next rotation stage. The computation of the approximated magnitude is performed when the I component and the Q component are either fixed point values or floating point values.

The computing means further comprises means for generating an absolute value of the real (I) component prior to performing the first one of the plurality of vector rotations, means for detecting a dropped least significant bit (LSB) of the Q component after a right shift operation for performing a rounding operation to maintain accuracy, and a pipeline of rotation stages for computing eight of the plurality of vector rotations, the outputs of a preceding stage being coupled to the inputs of each succeeding stage. The pipeline of rotation stages comprises a final stage coupled to the outputs of a last one of the rotation stages for output formatting and rounding the approximated magnitude computed by the preceding stages. The apparatus further comprises means coupled to the magnitude computing means for determining the phase of the complex number or vector by storing a sign bit of the initial I value and initial Q value of the complex number and a sign of the Q value computed for each rotation. The apparatus for determining the approxima of the magnitude and phase of a complex number or vector is implemented in a CMOS very large scale integrated (VLSI) circuit.

In accordance with a further feature of the invention, a method is provided for determining an approximation of a magnitude and phase of a complex number or vector comprising the steps of computing the approximated magnitude of a complex number or vector using an algorithm for computing a real (I) component and an imaginary (Q) component for each of a plurality of vector rotations of fixed decreasing predetermined values of angles such that the value of the Q component is reduced by approximately one-half with each of the succeeding rotations after a first rotation, the value of the I component at the end of said rotations being the approximated magnitude, and shifting the Q component on each rotation after the first rotation into a vacated most significant bit (MSB) position of the Q component resulting from the predetermined rotation in order to accommodate a one bit LSB growth in the next rotation. The step of computing the approximated magnitude comprises the step of detecting after each of the rotations an overflow of the sign of the Q component for selecting the proper direction of vector rotation in the next rotation stage, and the step of performing the computation of the approximated magnitude when the I component and the Q component are either fixed point values or floating point values.

The step of computing the approximated magnitude comprises generating an absolute value of the real (I) component prior to performing the first one of the plurality of vector rotations. The step of computing the approximated magnitude further comprises pipelining rotation stages for computing eight of the plurality of vector rotations, the outputs of a preceding stage being coupled to the inputs of each succeeding stage, and the step of computing the approximated magnitude comprises detecting a dropped least significant bit (LSB) of the Q component after a right shift operation for performing a rounding operation in the next rotation stage to maintain accuracy. The method further comprises the step of determining the phase of the complex number or vector during the computing of the approximated magnitude.

BRIEF DESCRIPTION OF THE DRAWINGS

Other and further features of the invention will become apparent in connection with the accompanying drawings wherein.

DESCRIPTION OF THE PREFERRED EMBODIMENT

Figure 1:
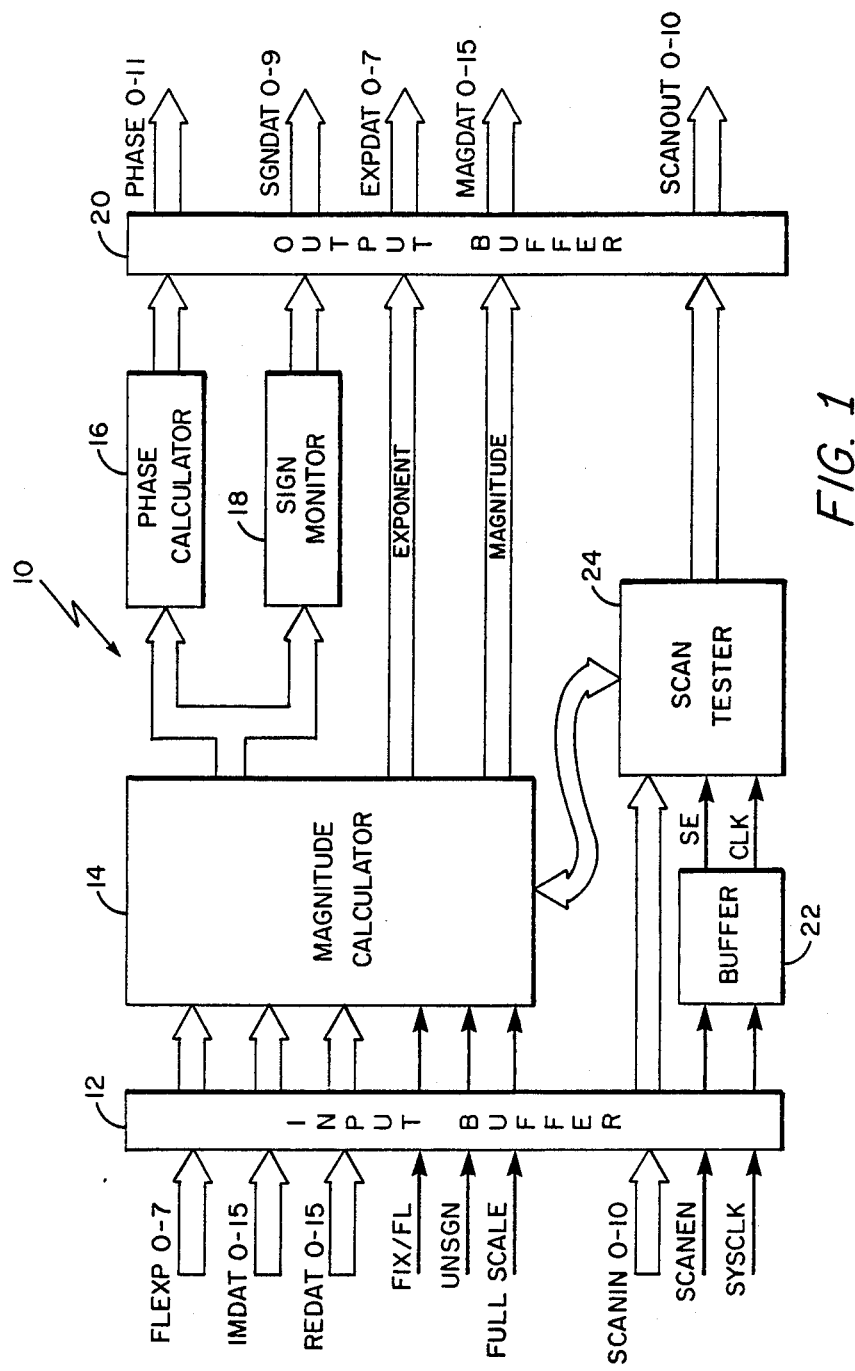
FIG. 1 is a functional block diagram of a cordic magnitude semiconductor chip for approximating the magnitude and the phase of a complex number or vector.

Referring now to FIG. 1 there is shown a functional block diagram of a cordic magnitude semiconductor chip 10 employing the invention for very accurately calculating the magnitude and phase of a complex number or vector I+jQ using an improved cordic magnitude algorithm. I represents the in-phase or real component of the complex number and Q represents the quadrature on imaginary component of the complex number. The cordic magnitude chip (CMC) is fabricated with a 1.25 micron CMOS technology and packaged in a 172 pin flat pack.

The CMC 10 as shown in FIG. 1 converts cartesion coordinates to polar coordinates by approximating the magnitude of complex numbers comprising two 16 bit fixed point numbers or block floating point numbers with 8 bit common exponents. The resulting magnitude is a 16 bit fixed point or floating point number with an 8 bit exponent. The CMC supports a data rate of 20 MHZ and the maximum percentage error for the approximated magnitude is less than 0.003%. The phase information is represented as a 12 bit data word in binary angle measurement system (BAMS) format and it is determinable to a resolution of +/− 0.224 Deg (LSB=180°/2048).

The input buffer 12 and buffer 22 provide drive capability within the chip for the input signals. The magnitude calculator 14 determines the magnitude of a complex number represented by real and imaginary input data words REDAT 0-15 and IMDAT 0-15. The phase calculator 16 which is coupled to the magnitude calculator 14 determines the phase of the complex number. The sign monitor 18 which is coupled to the magnitude calculator 14 provides sign history information for the I and Q components of the complex number or vector and the sign bits of the Q components over the eight cordic rotations. The output buffer 20 is coupled to the outputs of the magnitude calculator 14, phase calculator 16, sign monitor 18 and scan tester 24 and provides drive capability for the CMC output signals. The scan tester 24 provides a self-test capability within the CMC 10 for testing all registers. All of the input and output signals of the CMC 10 are described in Table 1. For normal operation the SCANEN input of the CMC 10 is set to a logical 0 so that the I and Q components pass through the pipeline registers within the magnitude calculator 14, phase calculator 16 and sign monitor 18. The FIX/FL input is set to a logical 0 if the CMC 10 is used in a floating point system and set to a logical 1 if the CMC 10 is used in a fixed point system. The FULL SCALE input is set to a logic 1 if a full scale magnitude output (all ones) is required when the exponent has a value of one (incorrect data input which causes overflow) in the fixed point case, otherwise it is set to a logic 0. The UNSGN input is set to a logic 1 if the magnitude is to be represented as a 15-bit number, otherwise it is set to a logic 0. The 8-bit FLEXP input is tied to logic 0 for a fixed point system. The CMC 10 does not need any external factors or control words to be loaded for initialization. These operating modes are summarized in Table 2.

TABLE 1

| SIGNAL NAME | SIGNAL DESCRIPTION | TYPE |
| --- | --- | --- |
| REDAT 0-15 | 16 BIT REAL DATA BUS | INPUT |
| IMDAT 0-15 | 16 BIT IMAGINARY DATA BUS | INPUT |
| FLEXP 0-7 | 8 BIT FLOATING POINT EXPONENT | INPUT |
| SCANNIN 0-10 | 11 1 BIT TEST DATA INPUTS | INPUT |
| FIX/FL | FIXED OR FLOATING POINT CONTROL SIGNAL | INPUT |
| SYSCLK | SYSTEM CLOCK | INPUT |
| SCANEN | TEST ENABLE SIGNAL | INPUT |
| FULL SCALE | FULL SCALE OUTPUT CONTROL SIGNAL | INPUT |
| UNSGN | 15 BIT MAGNITUDE OUTPUT CONTROL SIGNAL | INPUT |
| MAGDAT 0-15 | 16 BIT MAGNITUDE DATA BUS | OUTPUT |
| SCANOUT 0-10 | 11 BIT OUTPUT TEST BUS | OUTPUT |
| EXPDAT 0-7 | 8 BIT EXPONENT DATA BUS | OUTPUT |
| SGNDAT 0-9 | 10 BIT SIGN HISTORY | OUTPUT |
| PHASE 0-11 | 12 BIT PHASE OUTPUT IN BAMS FORMAT | OUTPUT |

TABLE 2

| Control Signal | Logical State | Function |
| --- | --- | --- |
| FIX/FL | 0 | Magnitude output is in floating point mode |
| | 1 | Magnitude output is in fixed point mode |
| UNSGN | 0 | Magnitude output is represented as 16 bit |
| | 1 | Magnitude output is represented as 15 bit |
| FULL SCALE | 0 | Magnitude output is half of true value |
| | 1 | Magnitude output is set to full scale |
| SCANEN | 0 | CMC is in normal operational mode |
| | 1 | CMC is in scan test mode |

Figure 2:
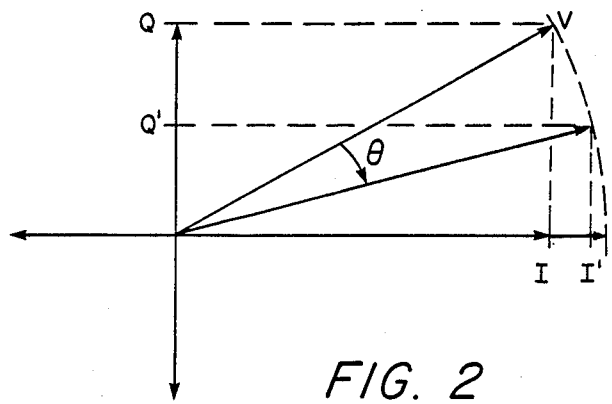
FIG. 2 shows a vector (V) rotation through an angle $\theta$ whereby the Q component decreases to Q' and the I component increases to I' illustrating one of eight rotations for approximating the magnitude of the vector by the I component after eight rotations.
Figure 3:
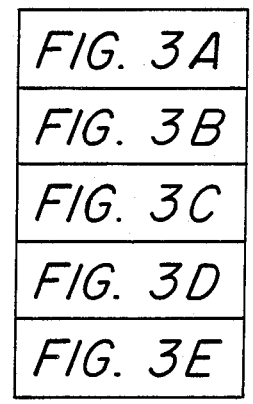
FIG. 3 is a sketch showing how

The CMC 10 approximates the magnitude of a complex vector I+jQ by performing a sequence of vector rotations of fixed decreasing values of angles. Only the direction of rotation changes, and this direction is determined by the sign of the imaginary component (Q) of the previous rotation. The object of each rotation is to align the vector with the real axis so that after the sequence of vector rotations, the real component (I) shall be the approximated magnitude. FIG. 2 illustrates the rotation of a vector V towards the real axis to a V' position wherein Q decreases to Q' and I increases to I'. During each rotation the imaginary component decreases and the real component increases by a factor equal to Sec $\theta$, where $\theta$ is the angle of rotation. In the present embodiment, after eight rotations, the real component is taken as the approximated magnitude of the input vector. The inherent growth due to the cordic algorithm for eight rotations is 1.6467. This growth factor is decreased to 0.9263 in the last stage (stage 10) by multiplying the approximated magnitude by 9/16 (in order to get closer to 1.00).

The computations performed during a rotation are as follows:

$|I(i)| = k(|I(i-1)| + 4^{-i+1} Q(i-1))$    If the vector falls
$Q(i) = k(2Q(i-1) - 2|I(i-1)|)$    in the 1st quadrant.

$|I(i)| = k(|I(i-1)| - 4^{-i+1} Q(i-1))$    If the vector falls
$Q(i) = k(2Q(i-1) + 2|I(i-1)|)$    in the 4th quadrant.

where:

|I0| = absolute value of the real component of the complex input vector (in-phase component)
Q0 = imaginary component of the complex input vector (quadrature component)
|I(i)| = the absolute value of the real component of the complex value after i CORDIC rotations
Q(i) = the imaginary component of the complex value after i CORDIC rotations
i = iteration or rotation index (1–8)
k = 4 if i > 1 and the three (3) MSBs of I(i−1) are equal to 0
k = 1 if i = 1, or any of the three (3) MSBs of I(i−1) are equal to 1
k = 2 if i = 2 and three (3) MSBs of I(i−1) are equal to zero and the fourth MSB is equal to one
k = 8 if i = 2 and the four (4) MSBs of I(i−1) are equal to zero If the input vector falls in the second or third quadrant then it is reflected into the first or fourth quadrant respectively by taking the absolute value of the real component.

The Q portion takes advantage of the fact that the most significant bit (MSB) position is vacated when the value of Q is reduced by one-half with each succeeding rotation. Then the Q value is doubled by a left shift which fills in the MSB position and provides for a vacated least significant bit (LSB) which is used for a one bit LSB growth in the next vector rotation. The I portion of the computations left justify the I component (and correspondingly shifts the Q component) by two (2) bit positions when the three MSBs are zeros. Hence, this reconfiguration accommodates a 2 bit LSB growth. The algorithms for the first three rotations are as follows:

1st Rotation   $I_1 = k_1(I_0 \pm Q_0)$    where $k = 1$
$Q_1 + k_1(2Q_0 \mp 2I_0)$ 2nd Rotation   $I_2 = k_2\left(I_1 \pm \frac{1}{4} Q_1\right)$    where $k = 1, 2$ or $8$
$Q_2 = k_2(2Q_1 \mp 2I_1)$ 3rd Rotation   $I_3 = k_3\left(I_2 \pm \frac{1}{16} Q_2\right)$    where $k_3 = 1$ or $4$
$Q_3 = k_3(2Q_2 \mp 2I_2)$ Referring now to FIG. 3 and FIGS. 3A-3E, FIG. 3 is a sketch showing how FIGS. 3A-3E are arranged to make up a functional block diagram of ten pipeline stages 30-48 of the CMC 10 which implement the improved cordic algorithm for calculating the magnitude and phase of the complex number I+jQ. The input data, REDAT 0-15 and IMDAT 0-15, for the initial vector comprises two's complement real (I) and imaginary (Q) components of a complex vector I+jQ which may be either 16 bit fixed point or 16 bit block floating point with 8 bit exponents. The I and Q components are 20-bits wide for rotations 2-8 in stages 2-8 respectively and 16-bits wide for rotation 1 in stage 1. All intermediate phase calculations are performed in 20-bits. The CMC 10 outputs the approximated magnitude as a 16-bit unsigned number for a fixed point system or a 16-bit unsigned number with an 8-bit exponent for a floating point system, the sign history as a 10-bit binary number, the phase of the complex vector as 12-bit number in BAMS format. If the UNSGN input is set to a logic 1 then the magnitude output is a 15-bit number.

Figure 3A:
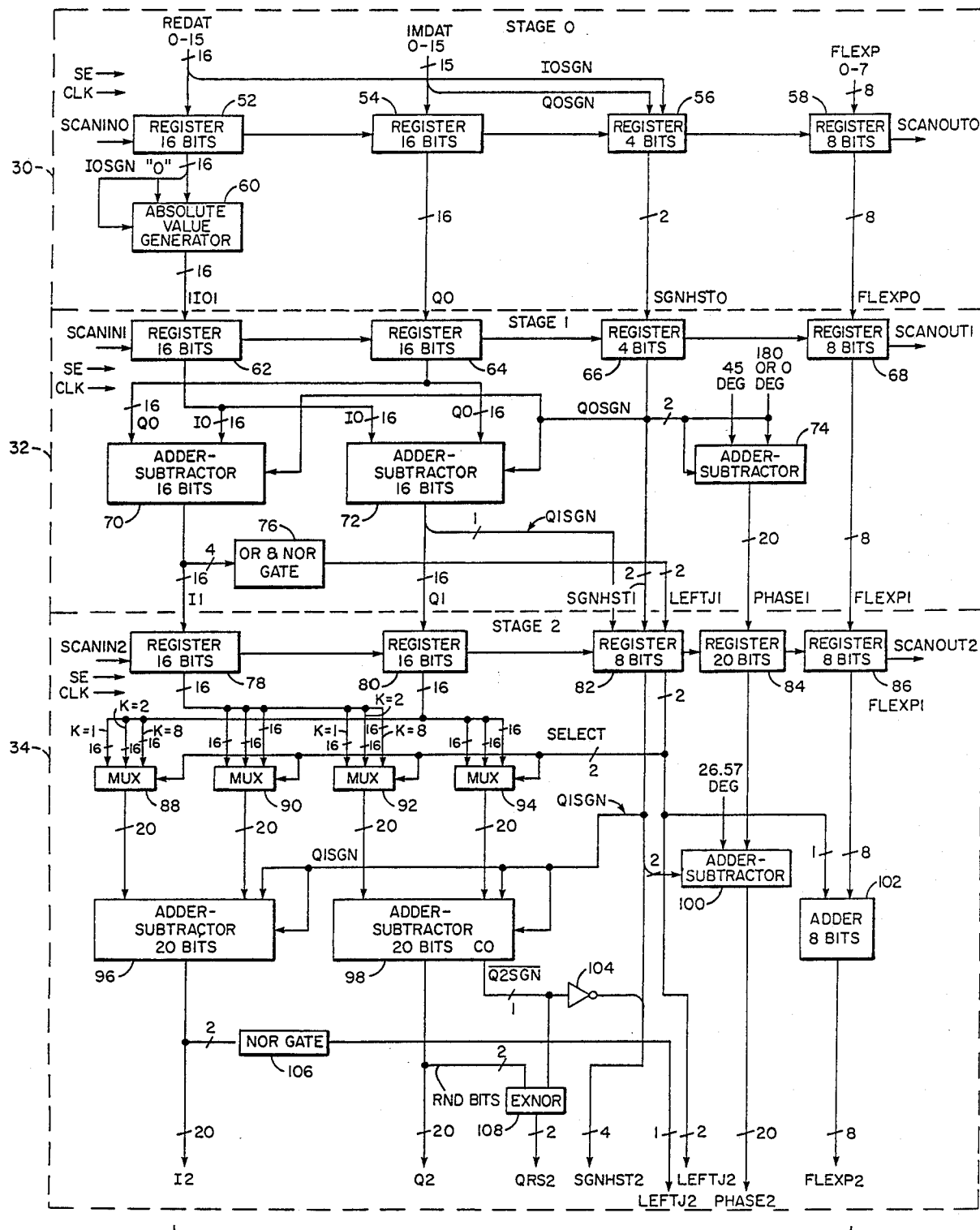
FIGS. 3A-3E are arranged to make up a functional block diagram of the invention showing ten pipeline stages, eight of which perform eight right rotation calculations of an improved cordic magnitude algorithm for determining the approximated magnitude and phase of a complex number or vector.

Referring to FIG. 3A, stage 0 30 comprises two 16 bit registers 52, 54 for storing the I and Q components, a 4 bit register 56 for storing I and Q sign data, an 8 bit register 58 for storing a floating point exponent and an absolute value generator 60 for converting the real component (I) to its absolute value. The absolute value generator 60 comprises an adder-subtractor (AS) such that if the real component (I) is negative, then it is complemented and one (1) is added to the least significant bit; otherwise, it passes straight through the adder-subtractor with no change. The imaginary component (Q) is not affected in the stage 0. Hence, the outputs of stage 0 are the original Q component (Q0), the absolute I component |I| the sign bits I0SGN and Q0SGN of the original I and Q components and a floating point exponent (FLEXP1, if dealing with block floating point input data). The registers 52, 54, 56 and 58 are serially connected in order to perform logic scan path testing readily known to one skilled in the art. All of the registers in each of the ten stages 30-48 have similar test capability.

Stage 1 32 performs the first cordic rotation and comprises four registers 62-68 as in Stage 0 30 for storing the I0 and Q0 components, sign history word (SGNHST0) and exponent word (FLEXP0) outputs from Stage 0 30. The sign bit of the Q component determines the direction of rotation. If it is negative, then the vector lies in the fourth quadrant and a counter clockwise rotation is performed. If it is positive, then the vector lies in the first quadrant and a clockwise rotation is performed. Also, the sign bit of the Q component selects the computations to be performed in order to determine the new rotated vector. The computations are performed by two adder-subtractors (AS) 70 and 72 which are each coupled to the outputs of registers 62 and 64 which store the I0 and Q0 original components. The four most significant bits (MSBs) of the I1 component are checked in the OR and NOR gates 76 to determine if the components can be left justified for the following stage. The phase of the complex vector is computed from the sign bits of the Q components over the eight rotations. Stage 1 initiates the phase computation in adder-subtractor 74 by looking at the sign bits of the original I0 and Q0 components. All phase computations are performed in 20 bits. The sign of the Q component from the previous rotation and the sign of the original I component (I0) determines whether the angle of rotation (45 DEG in stage 1) should be added or subtracted from the interim phase. Table 3 shows how the Q sign of the previous stage determines the phase output, and Table 4 shows the angles of rotation for each rotation. The outputs from stage 2 comprise the new I1 and Q1 components, the sign history (SGNHST1) which includes the sign bit of the new Q1 component (Q1SGN) along with the previous sign bits, two bits to flag left justify (LEFTJ1) the interim phase (PHASE1), and the exponent (FLEXP1).

TABLE 3

| Q sign | (previous stage) | Phase Output |
|---|---|---|
| 0 | | Interim phase + angle of rotation |
| 1 | | Interim phase − angle of rotation |

TABLE 4

| Rotation | Angles of Rotation |
|---|---|
| 1 | 45.00 DEG |
| 2 | 26.57 DEG |
| 3 | 14.04 DEG |
| 4 | 7.13 DEG |
| 5 | 3.58 DEG |
| 6 | 1.79 DEG |
| 7 | 0.90 DEG |
| 8 | 0.45 DEG |

Still referring to FIG. 3A, stage 2 34 performs the second cordic rotation and comprises five registers 78-86 for storing the outputs from stage 4 32. Registers 78 and 80 are 16 bit registers for storing the I1 and Q1 components resulting from the first rotation computations. An 8 bit register 82 stores the sign history (SGNHST1) and left justify flag bits (LEFTJ1); a 20 bit register 84 stores the interim phase (PHASE1) and an 8 bit register stores the exponent (FLEXP1). Before the second rotation is performed the 16 bit I1 component from stage 1 is expanded to 20 bits by adding an extra bit at the MSB side and three bits at the LSB side. Similarly, the 16 bit Q1 component from stage 1 is expanded to 20 bits by adding two extra bits at the MSB side and two bits at the LSB side. These four extra bits are added so that the growth in the I and Q components can be accommodated in stages 2 through 8. In accordance with the algorithm the computed I1 and Q1 components may have to be shifted left or right. This shifting is performed by four sets of multiplexers 88-94 coupled to the outputs of registers 78 and 80, and the left justify flag select bits from register 82 selects the appropriate shifted I1 and Q1 components for the second rotation. The outputs of the multiplexers coupled to the I and Q adder-subtractor are shown in Tables 5 and 6 respectively.

TABLE 5

| MULTIPLEXER OUTPUTS TO I ADDER-SUBTRACTOR | | | | | | | | | | | | | | | | | | | |
|---|---|---|---|---|---|---|---|---|---|---|---|---|---|---|---|---|---|---|---|
| | | | | | | | | | I Register Outputs | | | | | | | | | | |
| BIT | 1 | 0 | −1 | −2 | −3 | −4 | −5 | −6 | −7 | −8 | −9 | −10 | −11 | −12 | −13 | −14 | −15 | −16 | −17 | −18 |
| ROT 1 | | | | | | | | | | | Stage 1 | | | | | | | | | |
| I K = 1 | | 0 | −1 | −2 | −3 | −4 | −5 | −6 | −7 | −8 | −9 | −10 | −11 | −12 | −13 | −14 | −15 | | | |
| Q K = 1 | | 0 | −1 | −2 | −3 | −4 | −5 | −6 | −7 | −8 | −9 | −10 | −11 | −12 | −13 | −14 | −15 | | | |
| ROT, 2 | | | | | | | | | | | Stage 2 | | | | | | | | | |
| I K = 1 | Z | 0 | −1 | −2 | −3 | −4 | −5 | −6 | −7 | −8 | −9 | −10 | −11 | −12 | −13 | −14 | −15 | Z | Z | Z |

TABLE 5-continued

MULTIPLEXER OUTPUTS TO I ADDER-SUBTRACTOR

|   |       |   |    |    |    |    |    |    |    |    |    |     |     |     |     |     |     |     |     |     |     |
|---|-------|---|----|----|----|----|----|----|----|----|----|-----|-----|-----|-----|-----|-----|-----|-----|-----|-----|
|   | K = 2 | 0 | −1 | −2 | −3 | −4 | −5 | −6 | −7 | −8 | −9 | −10 | −11 | −12 | −13 | −14 | −15 | Z   | Z   | Z   | Z   |
|   | K = 8 | −2| −3 | −4 | −5 | −6 | −7 | −8 | −9 | −10| −11| −12 | −13 | −14 | −15 | Z   | Z   | Z   | Z   | Z   | Z   |     |
| Q | K = 1 | 1 | 1  | 1  | 0  | −1 | −2 | −3 | −4 | −5 | −6 | −7  | −8  | −9  | −10 | −11 | −12 | −13 | −14 | −15 | Z   |
|   | K = 2 | 1 | 1  | 1  | 0  | −2 | −3 | −4 | −5 | −6 | −7 | −8  | −9  | −10 | −11 | −12 | −13 | −14 | −15 | Z   |     |
|   |       |   |    |    | −1 |    |    |    |    |    |    |     |     |     |     |     |     |     |     |     |     |
|   | K = 8 | 0 | −1 | −2 | −3 | −4 | −5 | −6 | −7 | −8 | −9 | −10 | −11 | −12 | −13 | −14 | −15 | Z   | Z   | Z   | Z   |

ROT, 3 — Stage 3

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 2  | 1  | 0  | −1 | −2 | −3 | −4 | −5  | −6  | −7  | −8  | −9  | −10 | −11 | −12 | −13 | −14 |
|   | K = 4 | 3 | 2  | 1  | 0  | −1 | −2 | −3 | −4 | −5 | −6 | −7  | −8  | −9  | −10 | −11 | −12 | −13 | −14 | −15 | −16 |

ROT, 4 — Stage 4

| I | K = 1 | 1 | 0  | −1 | −2 | −3 | −4 | −5 | −6 | −7 | −8 | −9  | −10 | −11 | −12 | −13 | −14 | −15 | −16 | −17 | 18  |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 3  | 3  | 2  | 1  | 0  | −1 | −2 | −3  | −4  | −5  | −6  | −7  | −8  | −9  | −10 | −11 | −12 |
|   | K = 4 | 3 | 3  | 3  | 2  | 1  | 0  | −1 | −2 | −3 | −4 | −5  | −6  | −7  | −8  | −9  | −10 | −11 | −12 | −13 | −14 |

ROT, 5 — Stage 5

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 3  | 3  | 3  | 3  | 2  | 1  | 0  | −1  | −2  | −3  | −4  | −5  | −6  | −7  | −8  | −9  | −10 |
|   | K = 4 | 3 | 3  | 3  | 3  | 3  | 2  | 1  | 0  | −1 | −2 | −3  | −4  | −5  | −6  | −7  | −8  | −9  | −10 | −11 | −12 |

ROT, 6 — Stage 6

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 3  | 3  | 3  | 3  | 3  | 3  | 2  | 1   | 0   | −1  | −2  | −3  | −4  | −5  | −6  | −7  | −8  |
|   | K = 4 | 3 | 3  | 3  | 3  | 3  | 3  | 3  | 2  | 1  | 0  | −1  | −2  | −3  | −4  | −5  | −6  | −7  | −8  | −9  | −10 |

ROT, 7 — Stage 7

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 3  | 3  | 3  | 3  | 3  | 3  | 3  | 3   | 2   | 1   | 0   | −1  | −2  | −3  | −4  | −5  | −6  |
|   | K = 4 | 3 | 3  | 3  | 3  | 3  | 3  | 3  | 3  | 3  | 2  | 1   | 0   | −1  | −2  | −3  | −4  | −5  | −6  | −7  | −8  |

ROT, 8 — Stage 8

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 3 | 3  | 3  | 3  | 3  | 3  | 3  | 3  | 3  | 3  | 3   | 3   | 3   | 2   | 1   | 0   | −1  | −2  | −3  | −4  |
|   | K = 4 | 3 | 3  | 3  | 3  | 3  | 3  | 3  | 3  | 3  | 3  | 2   | 1   | 0   | −1  | −2  | −3  | −4  | −5  | −6  |     |

TABLE 6

MULTIPLEXER OUTPUTS TO Q ADDER-SUBTRACTOR

Q Register Outputs

| BIT |       | 2 | 1  | 0  | −1 | −2 | −3 | −4 | −5 | −6 | −7 | −8  | −9  | −10 | −11 | −12 | −13 | −14 | −15 | −16 | −17 |
|-----|-------|---|----|----|----|----|----|----|----|----|----|-----|-----|-----|-----|-----|-----|-----|-----|-----|-----|

ROT, 1 — Stage 1

| I | K = 1 |   | 0  | −1 | −2 | −3 | −4 | −5 | −6 | −7 | −8 | −9  | −10 | −11 | −12 | −13 | −14 | −15 |     |     |     |
|---|-------|---|----|----|----|----|----|----|----|----|----|-----|-----|-----|-----|-----|-----|-----|-----|-----|-----|
| Q | K = 1 | 0 | −1 |    | −3 | −4 | −5 | −6 | −7 | −8 | −9 | −10 | −11 | −12 | −13 | −14 | −15 |     |     |     |     |
|   |       |   |    | −2 |    |    |    |    |    |    |    |     |     |     |     |     |     |     |     |     |     |

ROT, 2 — Stage 2

| I | K = 1 | Z | 0  | −1 | −2 | −3 | −4 | −5 | −6 | −7 | −8 | −9  | −10 | −11 | −12 | −13 | −14 | −15 | Z   | Z   | Z   |
|---|-------|---|----|----|----|----|----|----|----|----|----|-----|-----|-----|-----|-----|-----|-----|-----|-----|-----|
|   | K = 2 | 0 | −1 | −2 | −3 | −4 | −5 | −6 | −7 | −8 | −9 | −10 | −11 | −12 | −13 | −14 | −15 | Z   | Z   | Z   | Z   |
|   | K = 8 | −2| −3 | −4 | −5 | −6 | −7 | −8 | −9 | −10| −11| −12 | −13 | −14 | −15 | Z   | Z   | Z   | Z   | Z   | Z   |     |
| Q | K = 1 | 1 |    | −1 | −2 | −4 | −5 | −6 | −7 | −8 | −9 | −10 | −11 | −12 | −13 | −14 | −15 | Z   | Z   | Z   |     |
|   |       |   |    |    | −3 |    |    |    |    |    |    |     |     |     |     |     |     |     |     |     |     |
|   | K = 2 | 0 | −1 | −2 | −3 | −4 | −5 | −6 | −7 | −8 | −9 | −10 | −11 | −12 | −13 | −14 | −15 | Z   | Z   | Z   | Z   |
|   | K = 8 | −2| −3 | −4 | −5 | −6 | −7 | −8 | −9 | −10| −11| −12 | −13 | −14 | −15 | Z   | Z   | Z   | Z   | Z   | Z   |     |

ROT, 3 — Stage 3

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1|    | −5 | −6 | −7 | −8 | −9 | −10| −11| −12| −13 | −14 | −15 | −16 | −17 | −18 | Z   | Z   |     |     |
|   |       | −2|    |    |    |    |    |    |    |    |    |     |     |     |     |     |     |     |     |     |     |
|   |       | −3|    |    |    |    |    |    |    |    |    |     |     |     |     |     |     |     |     |     |     |
|   |       | −4|    |    |    |    |    |    |    |    |    |     |     |     |     |     |     |     |     |     |     |
| Q | K = 1 | 1 | 0  | −1 | −2 | −3 | −4 | −5 | −6 | −7 | −8 | −9  | −10 | −11 | −12 | −13 | −14 | −15 | −16 | −17 | Z   |
|   | K = 4 | −1| −2 | −3 | −4 | −5 | −6 | −7 | −8 | −9 | −10| −11 | −12 | −13 | −14 | −15 | −16 | −17 | Z   | Z   |     |

ROT, 4 — Stage 4

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 1 | 0  | −1 | −2 | −3 | −4 | −5 | −6 | −7 | −8 | −9  | −10 | −11 | −12 | −13 | −14 | −15 | −16 | −17 | Z   |
|   | K = 4 | −1| −2 | −3 | −4 | −5 | −6 | −7 | −8 | −9 | −10| −11 | −12 | −13 | −14 | −15 | −16 | −17 | Z   | Z   |     |

ROT, 5 — Stage 5

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |
| Q | K = 1 | 1 | 0  | −1 | −2 | −3 | −4 | −5 | −6 | −7 | −8 | −9  | −10 | −11 | −12 | −13 | −14 | −15 | −16 | −17 | Z   |
|   | K = 4 | −1| −2 | −3 | −4 | −5 | −6 | −7 | −8 | −9 | −10| −11 | −12 | −13 | −14 | −15 | −16 | −17 | Z   | Z   |     |

ROT, 6 — Stage 6

| I | K = 1 | 1 | 0  | −1 | −2 | −3 | −4 | −5 | −6 | −7 | −8 | −9  | −10 | −11 | −12 | −13 | −14 | −15 | −16 | −17 | −18 |
|---|-------|---|----|----|----|----|----|----|----|----|----|-----|-----|-----|-----|-----|-----|-----|-----|-----|-----|
|   | K = 4 | −1| −2 | −3 | −4 | −5 | −6 | −7 | −8 | −9 | −10| −11 | −12 | −13 | −14 | −15 | −16 | −17 | −18 | Z   | Z   |

TABLE 6-continued

| | | | | | | | | | | MULTIPLEXER OUTPUTS TO Q ADDER-SUBTRACTOR | | | | | | | | | | |
|---|---|---|---|---|---|---|---|---|---|---|---|---|---|---|---|---|---|---|---|---|
| Q | K = 1 | 1 | 0 | −1 | −2 | −3 | −4 | −5 | −6 | −7 | −8 | −9 | −10 | −11 | −12 | −13 | −14 | −15 | −16 | −17 | Z |
|   | K = 4 | −1 | −2 | −3 | −4 | −5 | −6 | −7 | −8 | −9 | −10 | −11 | −12 | −13 | −14 | −15 | −16 | −17 | Z | Z | Z |
| ROT, 7 | | | | | | | | | | | Stage 7 | | | | | | | | | | |
| I | K = 1 | 1 | 0 | −1 | −2 | −3 | −4 | −5 | −6 | −7 | −8 | −9 | −10 | −11 | −12 | −13 | −14 | −15 | −16 | −17 | −18 |
|   | K = 4 | −1 | −2 | −3 | −4 | −5 | −6 | −7 | −8 | −9 | −10 | −11 | −12 | −13 | −14 | −15 | −16 | −17 | −18 | Z | Z |
| Q | K = 1 | 1 | 0 | −1 | −2 | −3 | −4 | −5 | −6 | −7 | −8 | −9 | −10 | −11 | −12 | −13 | −14 | −15 | −16 | −17 | Z |
|   | K = 4 | −1 | −2 | −3 | −4 | −5 | −6 | −7 | −8 | −9 | −10 | −11 | −12 | −13 | −14 | −15 | −16 | −17 | Z | Z | Z |
| ROT, 8 | | | | | | | | | | | Stage 8 | | | | | | | | | | |
| I | K = 1 | 1 | 0 | −1 | −2 | −3 | −4 | −5 | −6 | −7 | −8 | −9 | −10 | −11 | −12 | −13 | −14 | −15 | −16 | −17 | −18 |
|   | K = 4 | −1 | −2 | −3 | −4 | −5 | −6 | −7 | −8 | −9 | −10 | −11 | −12 | −13 | −14 | −15 | −16 | −17 | −18 | Z | Z |
| Q | K = 1 | 1 | 0 | −1 | −2 | −3 | −4 | −5 | −6 | −7 | −8 | −9 | −10 | −11 | −12 | −13 | −14 | −15 | −16 | −17 | Z |
|   | K = 4 | −1 | −2 | −3 | −4 | −5 | −6 | −7 | −8 | −9 | −10 | −11 | −12 | −13 | −14 | −15 | −16 | −17 | Z | Z | Z |

The direction of rotation is determined by the signs of the imaginary component (Q1SGN). The computations for the second rotation are performed by two 20 bit adder-subtractors 96 and 98. A value of one is added to the left justify count if the four MSBs of I1 are zero and one is added to the floating point exponent from register 86 by adder 102 if any three MSBs of I1 are equal to one. After the eight rotations the left justify count is the number of times a left justify was performed over the eight rotations. The 26.57 Deg rotation angle in this stage is added to the interim phase (PHASE1) from stage 1 which is stored in register 84 by adder-subtractor 100 if the original vector lies in the 1st or 3rd quadrants; otherwise, the 26.57 Deg rotation angle is subtracted from the interim phase (PHASE1). In order to maintain accuracy, one of the Q rounding bits (QRS2), depending on whether k=1 or k=4, that is dropped when right shifting the Q2 component will be used as a carry-in to the adder-subtractor 132 when computing I3 in stage 3. The value of this carry-in is computed as follows: If Q2 is a negative number, then the rounding bit will be inverted before being used in adder-subtractor 132 and, if Q2 is positive, then the rounding bit will be used as is. The carry-in bits (QRS2) generated to perform a rounding function are computed by the EXNOR 108 logic for use in the third rotation by stage 3. As shown in Table 6, Q-15 is dropped for the third rotation if the left justify flag is a logical 0 and if the left justify is a logical 1, Q-17 is dropped. Since no bits are dropped when Q1 is right justified in stage 1, the carry-in for the two AS 96,98 is controlled by the sign of Q1 (Q1SGN). The NOR gate 106 determines the left justify flag (LEFTJ2) for the next rotating stage. The outputs from stage 2 are the 20 bit I2 and Q2 components, the sign history word (SGNHST2), QRS2 bits for rounding, the left justify flag (LEFTJ2), the left justify count (LEFTJ1), the interim phase (PHASE2) and the common exponent (FLEXP2).

Figure 3B:
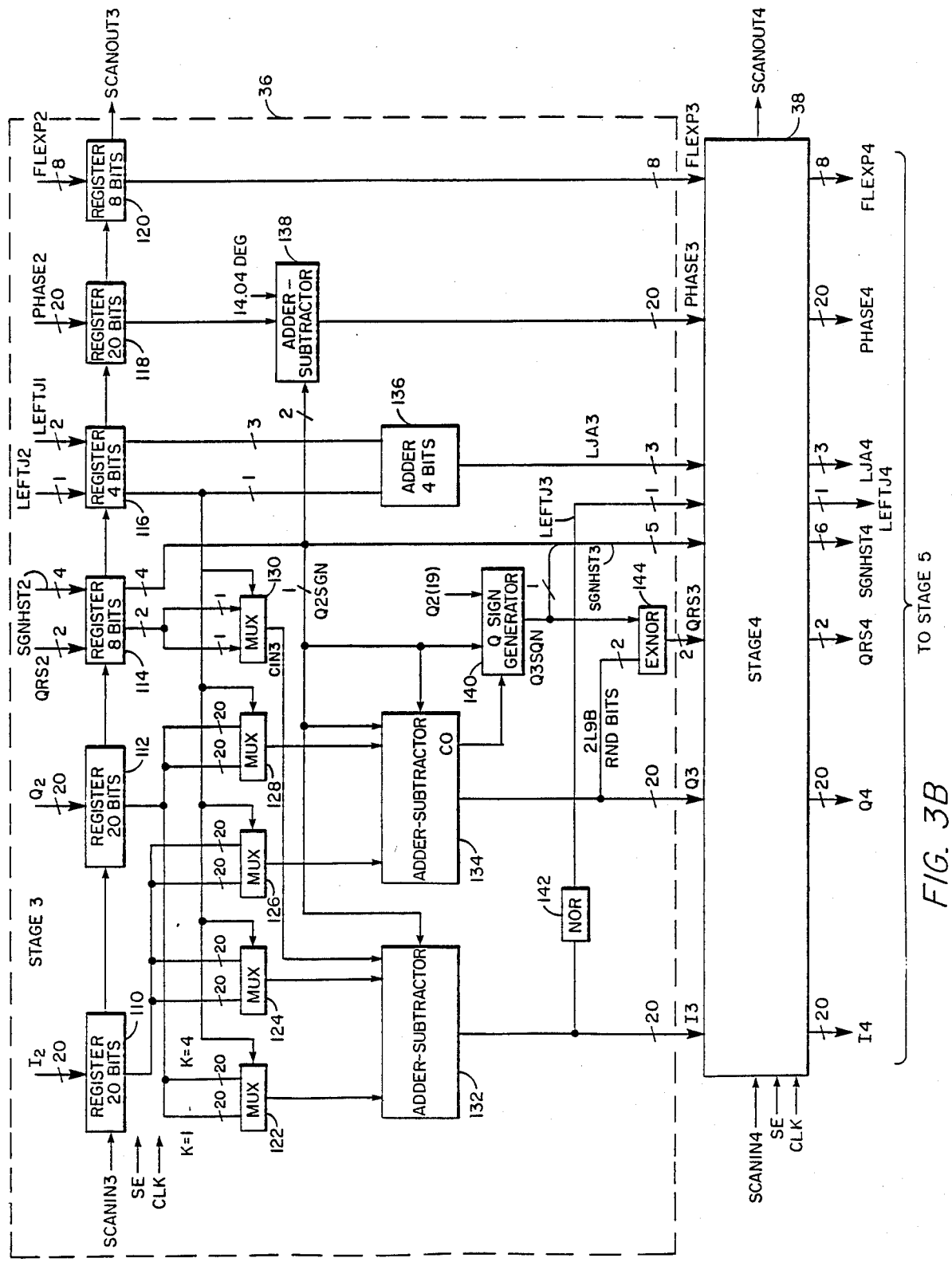

Referring now to FIG. 3B, stage 3 36 performs the computations for third cordic rotation and comprises six registers 110–120 for storing the outputs from stage 2 34. Registers 110 and 112 are 20 bit registers for storing the I2 and Q2 components resulting from the second rotation. An 8 bit register 114 stores the QRS2 rounding bits and the sign history (SGNHST2). A 4 bit register 116 stores the left justify flag (LEFTJ2) and the left justify count (LEFTJ1). A 20 bit register 118 stores the interim phase (PHASE2) and an 8 bit register 120 stores the common exponent (FLEXP2). In accordance with the algorithm the I2 and Q2 components stored in registers 110 and 112 may have to be shifted left or right. This shifting is performed by four sets of multiplexers 122–128 similar to those in stage 2 which are coupled to the outputs of registers 110 and 112. An additional 4 bit 2:1 multiplexer 130 selects one of the two rounding bit inputs (QRS2) to stage 3 36 in order to provide a carry-in (CIN3) signal to adder-subtractor 132 to accomplish the rounding resulting from a dropped Q2 bit after a right shift. The outputs of the multiplexers for each rotation are shown in Tables 5 and 6. The outputs of multiplexers 122 and 124 are coupled to adder-subtractor 132 and the outputs of multiplexers 126 and 128 are coupled to adder-subtractor 134. The two adder-subtractors 132, 134 compute the I3 and Q3 components. A 4 bit adder 136 coupled to the outputs of register 116 adds one to the left justify count if the left justify flag (LEFTJ2) is set and provides the new left justified accumulated count (LJA3) to the next stage. The 14.04 DEG rotation angle in this stage is added to or subtracted from the interim phase (PHASE2) from stage 2, which is stored in register 118, by adder-subtractor 138 depending on the sign of Q from the previous stage and the sign of the original I component (I0). The NOR gate 142 generates a the left justify flag (LEFTJ3) for the next rotation stage. The Q sign generator 140 is coupled to the carry-out of adder-subtractor 134 and the Q2SGN and generates the Q3SGN for the sign history (SGNHST4). The sign of the new Q component (Q3 in stage 3) is the carry-out (CO) of AS 134 if the Q component from the previous stage has not overflowed. A 2 to 1 selector in the Q sign generator 140 selects between the carry-out (CO) of AS 134 and the previous Q sign (Q2SGN). The overflow condition is detected by exclusive-ORing the Q19 bit of the previous Q component with the sign bit of the previous Q. The result is used to make the selection for the new Q sign bit. If the Q component from the previous stage overflows, then the sign of the new Q component is the same as the previous Q sign. After each rotation, there can be conditions depending on the input I and Q values, which may cause the sign of the Q component to overflow to the 21st bit. The Q19 bit of Q component cannot be used as the sign bit because if an overflow condition exists, the vector will be rotated in the wrong direction in the following stage causing erroneous results. The Q3SGN is also coupled to EXNOR gates 144 along with two LSB round bits (RND BITS) depending on the k value from the Q3 outputs of adder-subtractor 134 for generating the (QRS3) signal for the I adder-subtractor in the next stage 4 for rounding depending on the dropped bit after right shifting Q3. The outputs from stage 3 are the 20 bit I3 and Q3 components, the QRS3 bits for rounding, the sign history word (SGNHST3), the left justify flag (LEFTJ3), the left justify accumulated count (LJA3), the interim phase (PHASE3) and the common exponent (FLEXP3).

Figure 3C:
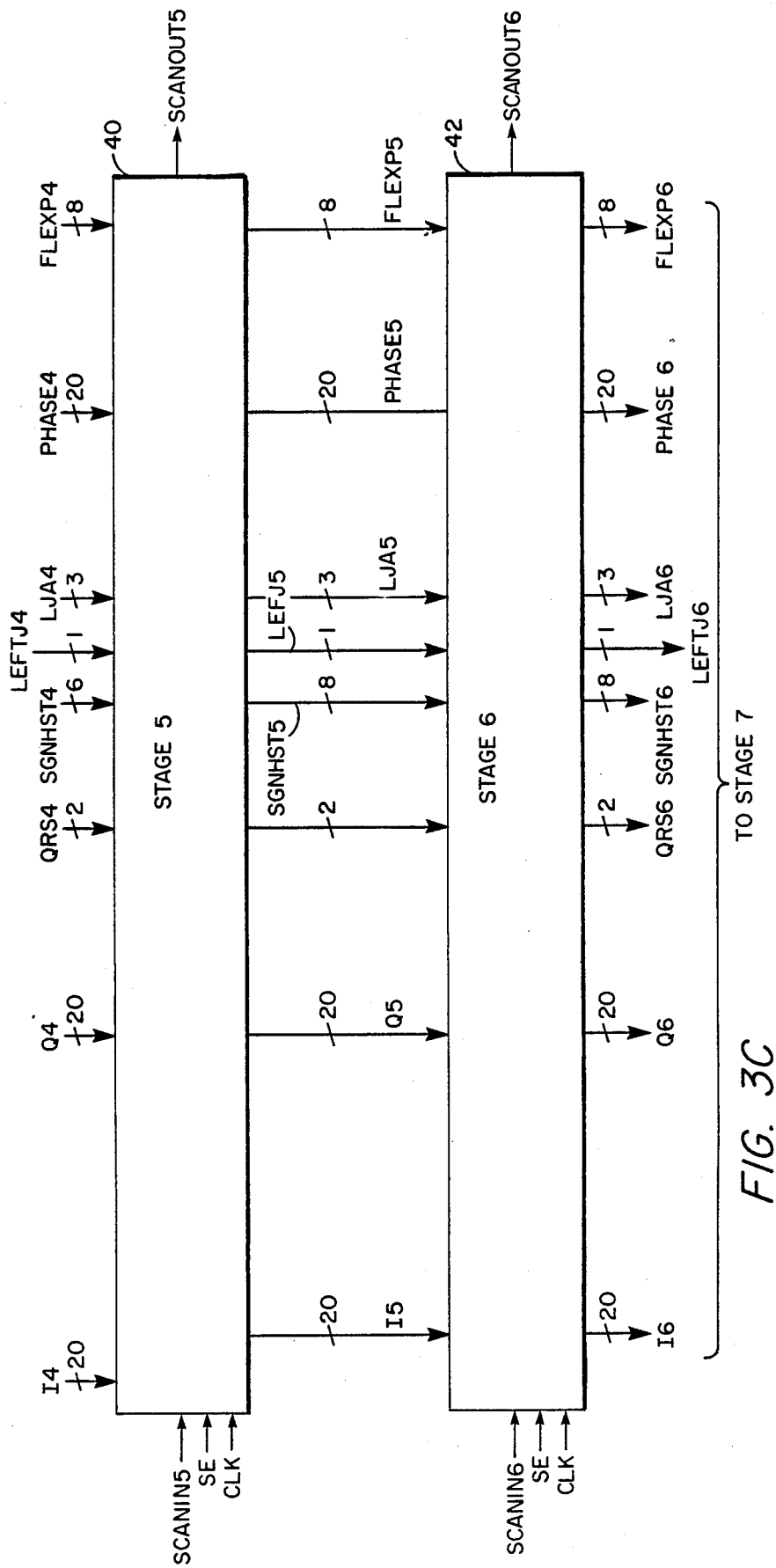
Figure 3D:
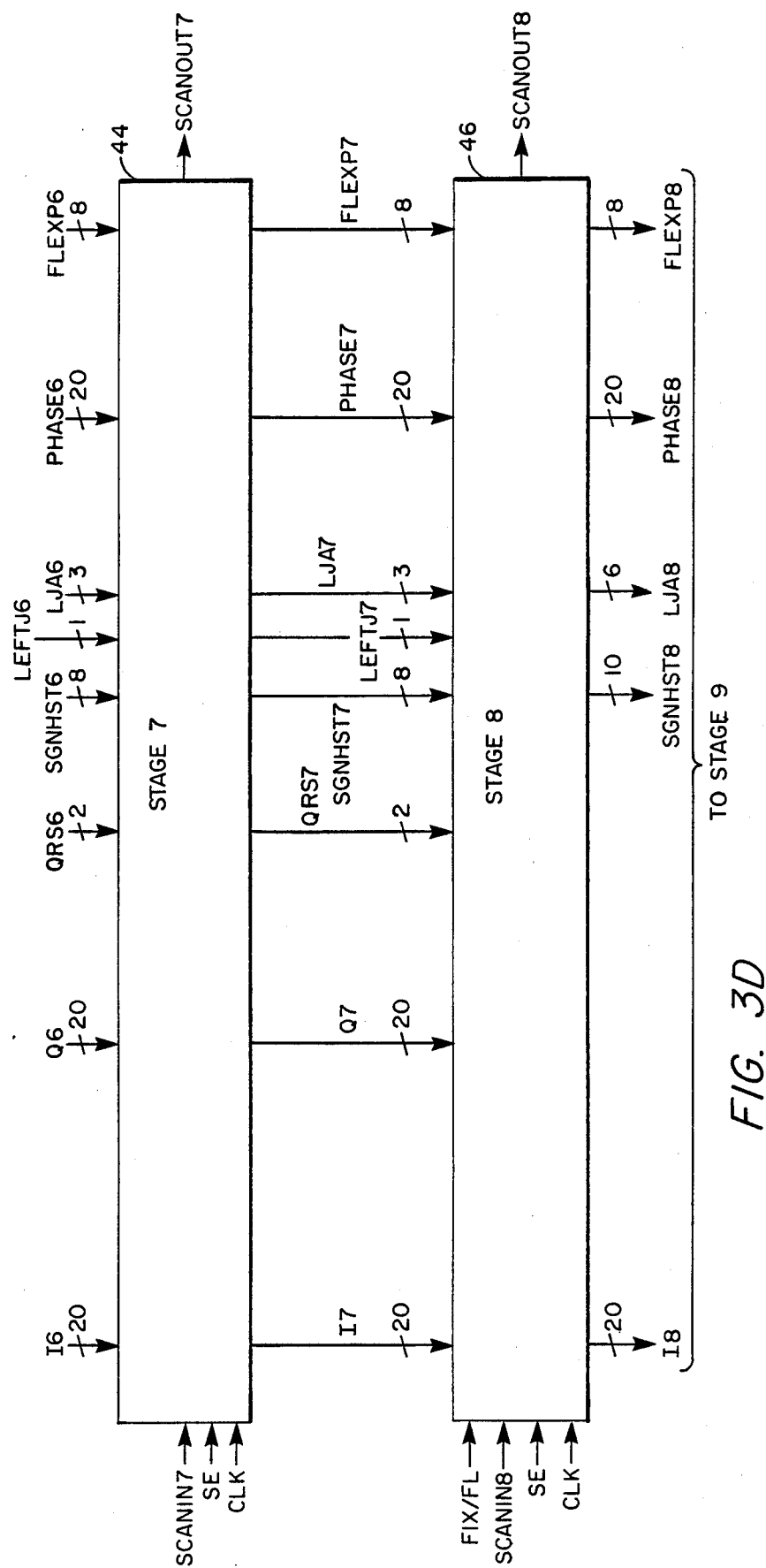

Referring now to FIGS. 3B, 3C and 3D block diagrams of stages 4, 5, 6, 7 and 8 (38–46) are shown with inputs and outputs. These stages are similar to stage 3 36 performing the calculations for the fourth rotation (7.13 DEG), fifth rotation (3.58 DEG), sixth rotation (1.79 DEG), seventh rotation (0.90 DEG) and the eighth rotation (0.45 DEG). The multiplexer outputs in each of these stages are shown in Tables 5 and 6. However, stage 8 46 has the additional signal input, FIX/FL for fixed or floating point control. Also, although this stage for the eighth rotation is similar to stage 3, it does not have the NOR gate to generate a left justify flag and the EXNOR gates to generate the rounding bits as in previous stages since there are no further rotation calculations.

Figure 4:
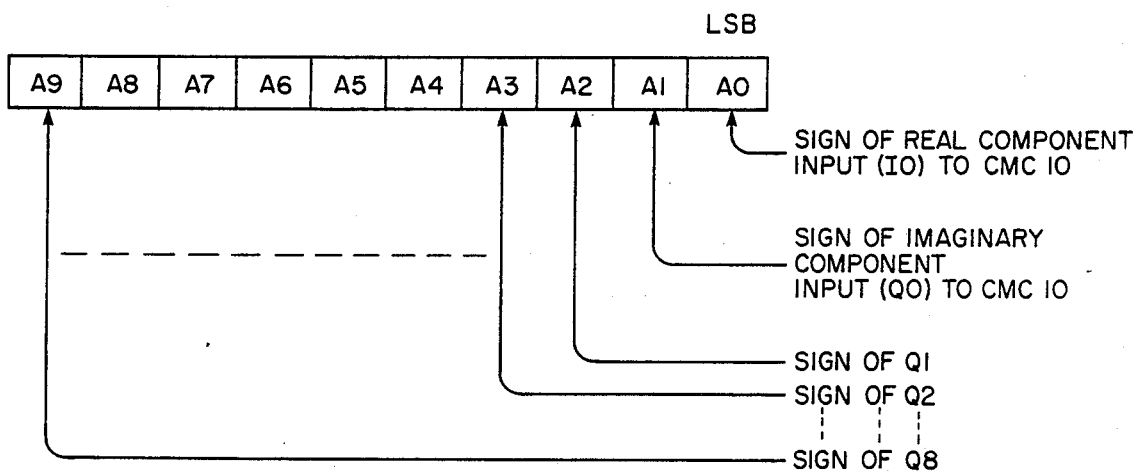
FIG. 4 shows the 10 bit sign history output word from the cordic magnitude chip.
Figure 3E:
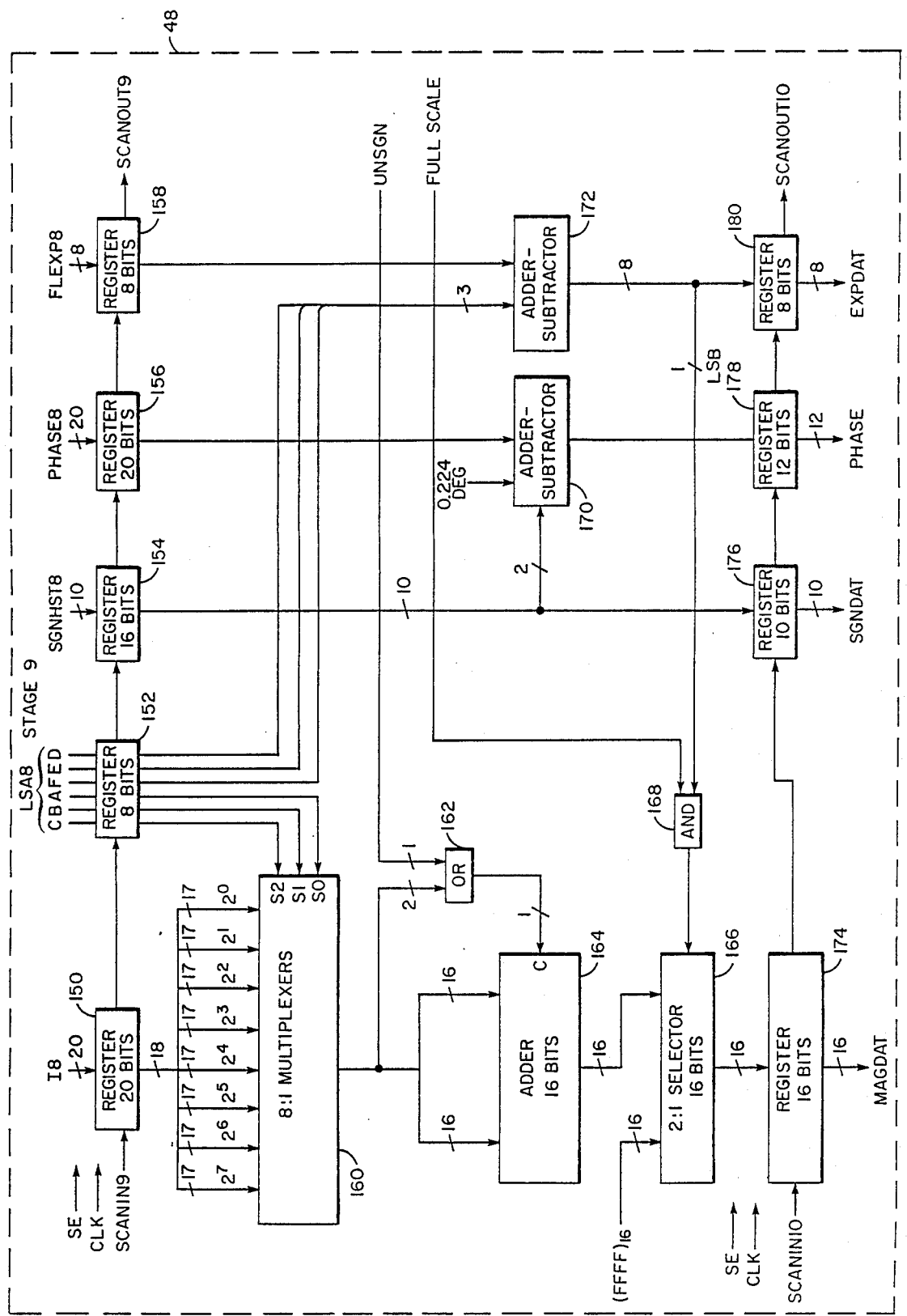

Referring now to FIG. 3E and FIG. 4, stage 9 48 is the final stage for output formatting and rounding the approximated magnitude to a 16 bit unsigned number. The outputs from stage 8 46 which are coupled to stage 9 and stored in registers 150, 152, 154, 156 and 158 include the 20 bit I8 component which is the final approximated magnitude, the 6 bit left justify count (FXEXP8), the 10 bits of the sign history over the eight rotations (SGNHST8) as shown in FIG. 4, the 20 bit phase of the original vector (PHASE8) and the 8 bit common exponent (FLEXP8). If the initial vector input (represented by I0 and Q0) is a fixed point number, then I8 has to be right shifted by two times the left justify accumulated count (LJA8) which is stored in sections C, B and A of register 152. Each time a left justify was performed during the rotation, the I and Q components were left justified twice. The shifting is accomplished by 8:1 multiplexers 160 in accordance with the select inputs S0, S1, S2 from register 152. The upper 16 bits of the selected 17 bit output from multiplexer 160 (I'8) and the upper 16 bits of 1/8 I'8 are added together by 16 bit adder 164. The 17th bit of either I'8 or 1/8 I'8 is used as the rounding bit in accordance with OR gate 162 which also provides the 15 BIT UNSGN signal to adder 164. The purpose of adding 1/8 I'8 to I'8 is to make the growth factor equal to 1.8526 instead of 1.64 (i.e. closer to 2.00). The 16 bit output from adder 164 is the unsigned magnitude. Also in the fixed point case, the exponent stored in register 158 should have a value of zero after the eight rotation computations. If this exponent has a value of one, then an overflow has occurred after the first rotation due to an out of limit error in the 16 bit I or Q component input values to the CMC 10, and the user has a choice to output the magnitude as all ones when the FULL SCALE input is set to a logical 1 or to output the magnitude as is when the FULL SCALE input is set to a logical 0 and gate 168 receives the exponent bit and FULL SCALE signal and controls the 2:1 selector 166 for making the above choice. The calculated magnitude is one-half of what it should be if the exponent has a value of one so the user has to modify the magnitude externally. If the initial vector is described by block floating point numbers, then I8 is not shifted and the upper 17 bits are used for input to adder 164. The left justify accumulated (LSA8) count stored in register 152 from the previous stage is doubled by the manner in which the outputs from register 152 are used to adder-subtractor 172 and subtracted from the exponent stored in register 158 by adder-subtractor 172 so that the true exponent is determined. The final phase calculation is performed by adder-subtractor 170 which receives the PHASE8 word stored in register 156 and a 0.224 DEG signal and provides a 12 bit word (PHASE) representing the phase of the polar coordinates of the initial vector in the binary angular measurement system (BAMS). If there was a ninth rotation stage, the 0.224 DEG. input would be a next rotation angle, and since the sign of Q after the eighth rotation indicates the direction of rotation, the 0.244 DEG. input is used to obtain a more accurate phase result. The upper 15 bits of the adder output 164 can represent the magnitude if the UNSIGN signal is set to a logic 1 so that the carry-in bit to adder 164 is added to the 15th bit of the adder 164 inputs. This option allows the cordic magnitude chip (CMC) 10 to be used in a system where a 16 bit signed magnitude is required; hence, the 16 bit signed magnitude comprises the 15 bit output from the CMC 10 and a zero at the MSB to represent the sign bit. The final outputs from stage 9 comprise the 16 bit approximated magnitude (MAGDAT), the 12 bit phase (PHASE), the 8 bit exponent (EXPDAT) and the 10-bit sign history (SGNDAT).

Referring now to FIG. 4, the bit portions of the accumulated sign history is shown. The sign bits (SGNDAT) out of stage 9 48 can be used to address a ROM in order to obtain the actual phase value of the original vector. The phase of the complex vector is computed from the sign history as follows: The angles by which the vector is rotated during the eight rotations are 45°, 26.57°, 14.04°, 7.13°, 3.58°, 1.79°, 0.90° and 0.45°. These angles are given by the equation: $\theta = \tan^{-1}(2^{(1-i)})$ where i is the rotation index.

The phase angle is given by the following equations:

$$\theta = \tan^{-1}(2^{(1-i)}) \text{ where } i \text{ is the rotation index.}$$

The phase angle is given by the following equations:

$$\phi = 0 + X, \quad \text{if } A1A0 = 00$$
$$\phi = 180 - X, \quad \text{if } A1A0 = 01$$
$$\phi = 180 + X, \quad \text{if } A1A0 = 11$$
$$\phi = 0 - X, \quad \text{if } A1A0 = 10$$

where
X = ±45°±26.57°±14.04°±7.13°±3.58°±1.79°±0.9°-±0.45°±0.224°

If A1,A0=00 or A1,A0=11, then +45
If A1,A0=01 or A1,A0=10, then −45
If A2,A0=00 or A2,A0=11, then +26.5
If A2,A0=01 or A2,A0=10, then −26.5 and so on for $A_3 - A_g$.

The phase of the vector is accurate to within ±0.224 after eight rotations.

Referring now to FIG. 1 and FIGS. 3A–3E, the pipeline registers in CMC 10 are designed using scannable registers connected as shift registers so that each pipeline register has a scan path. Each scan path has a dedicated SCANIN 0-10 input and a SCANOUT 0-10 output. All the test data is loaded serially into the pipeline registers using the SCANIN 0-10 inputs. The number of clock pulses required to load the test data depends on the width of the pipeline register under test. The pipeline registers can be tested by loading test data via the SCANIN 0-10 input and reading the outputs via the SCANOUT 0-10 outputs. The computation circuitry within a stage can be tested by loading the test data into the pipeline register of a stage via the SCANIN 0-10 input and then the results are read via the SCANOUT 0-10 output of the pipeline register in the following stage. The logic devices or their equivolent used to implement the function ad design shown in FIGS. 3A-3E is readily known to one skilled in the art. However, the CMC 10 was implemented with 1.25 micron CMOS VLSI technology using macrocells from the RD, RE, RF and RM libraries of the Advanced Device Center of Raytheon Company in Andover, Mass.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. Apparatus for determining an approximated magnitude of a complex number or vector comprising:
   means having a plurality of stages for computing a real (I) component and an imaginary (Q) component for each of a plurality of vector rotations of fixed decreasing predetermined values of angles such that the value of said Q component is reduced by approximately one-half each of said vector rotations after a first rotation, said I and Q components for each of said vector rotations being computed by one of said plurality of stages respectively, the value of said I component at the end of said rotations being said approximated magnitude; and
   each of said vector rotation stages of said computing means comprising shifting means for shifting said Q component on each rotation after said first rotation into a vacated most significant bit (MSB) position of said Q component resulting from said vector rotations in order to accommodate a one bit LSB growth in the next rotation; and
   said shifting means further comprises means for left justifying said I component and correspondingly shifting said Q component into said vacated MSB position of said Q component before each of said rotations after said first rotation is performed, providing the three most significant bits of said I component are zero.

2. The apparatus as recited in claim 1 wherein:
   said computing means comprises means for detecting after each of said rotations an overflow of the sign of said Q component for selecting the proper direction of vector rotation in the next rotation stage.

3. The apparatus as recited in claim 1 wherein:
   said computing means comprises means for performing the computation of said approximated magnitude when said I component and said Q component are fixed point values or floating point values.

4. The apparatus as recited in claim 1 wherein:
   said computing means comprises means for generating an absolute value of said real (I) component prior to performing the first one of said plurality of vector rotations.

5. The apparatus as recited in claim 1 wherein:
   said computing means comprises a pipeline of rotation stages for computing eight of said plurality of vector rotations, the outputs of a preceding stage being coupled to the inputs of each succeeding stage.

6. The apparatus as recited in claim 5 wherein:
   said pipeline of rotation stages comprises a final stage coupled to the outputs of a last one of said rotation stages for output formatting and rounding said approximated magnitude computed by said rotation stages.

7. The apparatus as recited in claim 1 wherein:
   said computing means comprises means for detecting a dropped least significant bit (LSB) of the Q component after a right shift operation for performing a rounding operation to maintain accuracy.

8. The apparatus as recited in claim 1 wherein:
   said apparatus for determining an approximation of a magnitude and phase of a complex number or vector is implemented in a CMOS integrated circuit.

9. The apparatus as recited in claim 1 wherein:
   said apparatus further comprises means coupled to said computing means for determining the phase of said complex number of vector.

10. Apparatus for determining an approximation of a magnitude and phase of a complex number or vector comprising:
    means for computing the approximated magnitude of a complex number or vector by computing a real (I) component and an imaginary (Q) component for each of a plurality of vector rotations of fixed decreasing predetermined values of angles such that the value of said Q component is reduced by approximately one-half with each of said vector rotations after a first rotation, the value of said I component at the end of said rotations being said approximated magnitude;
    said computing means comprises shifting means for shifting said Q component on each rotation after said first rotation into a vacated mos significant bit (MSB) position of said Q component resulting from said vector rotations in order to accommodate a one bit LSB growth in the next rotation;
    said shifting further comprises means for left justifying said I component and correspondingly shifting said Q component into said vacated MSB position of said Q component before each of said rotations after said first rotation is performed, providing th three most significant bits of said I component are zero; and
    means coupled to said computing means for determining the phase of the complex number or vector by using a sign bit of an initial I value and an initial Q value of the complex number and a sign of the Q value computed for each rotation.

11. The apparatus as recited in claim 10 wherein:
    said computing means comprises means for detecting after each of said rotations an overflow of the sign of said Q component for selecting the proper direction of vector rotation in the next rotation stage.

12. The apparatus as recited in claim 10 wherein:
    said computing means comprises means for performing the computation of said approximated magnitude when said I component and said Q component are fixed point values or floating point values.

13. The apparatus as recited in claim 10 wherein:
    said computing means comprises means for generating an absolute value of said real (I) component prior to performing the first one of said plurality of vector rotations.

14. The apparatus as recited in claim 10 wherein:
    said computing means comprises a pipeline of rotation stages for computing eight of said plurality of vector rotations, the outputs of a preceeding stage being coupled to the inputs of each succeeding stage.

15. The apparatus as recited in claim 14 wherein:
    said pipeline of rotation stages comprises a final stage coupled to the outputs of a last one of said rotation stages for output formatting and rounding said approximated magnitude computed by said rotation stages.

16. The apparatus as recited in claim 10 wherein:
said computing means comprises means for detecting a dropped least significant bit (LSB) of the Q component after a right shift operation for performing a rounding operation to maintain accuracy.

17. The apparatus as recited in claim 10 wherein:
said apparatus for determining an approximation of a magnitude and phase of a complex number or vector is implemented in a CMOS very large scale integrated (VLSI) circuit.

18. A method for determining an approximated magnitude of a complex number or vector comprising the steps of:
computing with a plurality of stages a real (I) component and an imaginary (Q) component for each of a plurality of vector rotations of fixed decreasing predetermined values of angles such that the value of said Q component is reduced by approximately one-half with each of said vector rotations after a first rotation, said I and Q components for each of said vector rotations being computed by one of said plurality of stages respectively, th value of said I component at the end of said rotations being said approximated magnitude; and
shifting in each of said vector rotation stages of said computing means said Q component on each rotation after said first rotation into a vacated most significant bit (MSB) position of said Q component resulting from said predetermined rotation in order to accommodate a one bit LSB growth in the next rotation; and
left justifying the I component and correspondingly shifting the Q component into said vacated MSB position of said Q component before each of said rotations after said first rotation is performed, providing the three most significant bits of said I component are zero.

19. The method as recited in claim 18 wherein:
said step of computing the approximated magnitude comprises detecting after each of said rotations an overflow of the sign of said Q component for selecting the proper direction of vector rotation in the next rotation stage.

20. The method as recited in claim 18 wherein:
said step of computing the approximated magnitude comprises performing the computation of said approximated magnitude when said I component and said Q component are fixed point values or floating point values.

21. The method as recited in claim 18 wherein:
said step of computing the approximated magnitude comprises generating an absolute value of said real (I) component prior to performing the first one of said plurality of vector rotations.

22. The method as recited in claim 18 wherein:
said step of computing the approximated magnitude comprises pipelining rotation stages for computing eight of said plurality of vector rotations, the outputs of a preceding stage being coupled to the inputs of each succeeding stage.

23. The method as recited in claim 22 wherein:
said step of pipelining rotation stages comprises a final stage coupled to the outputs of a last one of said rotation stages for output formatting and rounding said approximated magnitude computed by said rotation stages.

24. The method as recited in claim 18 wherein:
said step of computing the approximated magnitude comprises detecting a dropped least significant bit (LSB) of the Q component after a right shift operation for performing a rounding operation to maintain accuracy.

25. The method as recited in claim 18 wherein said method further comprises the step of determining the phase of said complex number or vector during said computing of the approximated magnitude.

26. A method for determining an approximation of a magnitude and phase of a complex number or vector comprising the steps of:
computing the approximated magnitude of a complex number or vector with means for computing a real (I) component and an imaginary (Q) component for each of a plurality of vector rotations of fixed decreasing predetermined values of angles such that the value of said Q component is reduced by approximately one-half with each of said vector rotations after a first rotation, the value of said I component at the end of said rotations being said approximated magnitude; and
shifting said Q component with shifting means included in said computing means on each rotation after said first rotation into a vacated mos significant bit (MSB) position of said Q component resulting from said predetermined rotation in order to accommodate a one bit LSB growth in the next rotation;
left justifying the I component and correspondingly shifting the Q component into said vacated MSB position of said Q component before each of said rotations after said first rotation is performed with said shifting means included in said computing means, providing the three most significant bits of said I component are zero; and
determining the phase of the complex number or vector with means coupled to said shifting means by using a sign bit of an initial I value and an initial Q value of the complex number and a sign of the Q value computed for each rotation.

27. The method as recited in claim 26 wherein:
said step of computing th approximated magnitude comprises detecting after each of said rotations an overflow of the sign of said Q component for selecting the proper direction of vector rotation in the next rotation stage.

28. The method as recited in claim 26 wherein:
said step of computing the approximated magnitude comprises performing the computation of said approximated magnitude when said I component and said Q component are fixed point values or floating point values.

29. The method as recited in claim 26 wherein:
said step of computing the approximated magnitude comprises generating an absolute value of said real (I) component prior to performing the first one of said plurality of vector rotations.

30. The method as recited in claim 26 wherein:
said step of computing the approximated magnitude comprises pipelining rotation stages for computing eight of said plurality of vector rotations, the outputs of a preceding stage being coupled to the inputs of each succeeding stage.

31. The method as recited in claim 30 wherein:

said step of pipelining rotation stages comprises a final stage coupled to the outputs of a last one of said rotation stages for output formatting and rounding said approximated magnitude computed by said rotation stages.

32. The method as recited in claim 26 wherein:
said step of computing the approximated magnitude comprises detecting a dropped least significant bit (LSB) of the Q component after a right shift operation for performing a rounding operation to maintain accuracy.

33. The method as recited in claim 26 wherein said method further comprises the step of determining the phase of said complex number or vector during said computing of the approximated magnitude.

34. A cordic magnitude CMOS integrated circuit for determining an approximation of a magnitude and phase of a complex number or vector comprising:
  means for buffering a plurality of input signals, said signals comprising real and imaginary data words specifying a vector input;
  mans coupled to said input signals buffering means for computing the approximated magnitude of a complex number or vector by computing a real (I) component and an imaginary (Q) component for each of a plurality of vector rotations of fixed decreasing predetermined values of angles such that the value of said Q component is reduced by approximately one-half with each of said vector rotations after a first rotation, the value of said I component at the end of said rotations being said approximated magnitude, said computing means comprising shifting means for shifting said Q component on each rotation after said first rotation into a vacated most significant bit (MSB) position of said Q component resulting from said predetermined rotation in order to accommodate a one bit LSB growth in the next rotation; and
  means coupled to said computing means for determining the phase of said complex number or vector by using a sign bit of an initial I value and an initial Q value of the complex number and a signal of a Q value computed for each rotation;
  scan-testing means coupled to said magnitude computing means and said phase determining means for testing the logic circuits used for computing said approximated magnitude and phase in accordance with scan test control signals; and
  means coupled to said computing means said phase determining means and said scan testing means for buffering all output signals from said integrated circuit.

35. The cordic magnitude CMOS integrated circuit as recited in claim 34 wherein:
said shifting means further comprises means for left justifying said I component and correspondingly shifting said Q component into said vacated MSB position of said Q component before each of said rotations after said first rotation is performed, providing the three most significant bits of said I component are zero.

* * * * *